(12) United States Patent
Baldock et al.

(10) Patent No.: US 6,231,230 B1
(45) Date of Patent: May 15, 2001

(54) RETRACTABLE THERMOWELL

(75) Inventors: Michael B. Baldock, Edmonton; Louis R. Provencal, Vimy, both of (CA)

(73) Assignee: Alltemp Sensors Inc., Edmonton (CA)

( * ) Notice: Subject to any disclaimer, the term of this patent is extended or adjusted under 35 U.S.C. 154(b) by 0 days.

(21) Appl. No.: 09/274,210

(22) Filed: Mar. 23, 1999

(51) Int. Cl.[7] ................ G01K 1/00; G01K 1/14
(52) U.S. Cl. ........................ 374/208; 374/179
(58) Field of Search ..................... 374/208, 179

(56) References Cited

U.S. PATENT DOCUMENTS

| | | | | |
|---|---|---|---|---|
| 2,785,216 | * | 3/1957 | Winner, Jr. | 374/208 |
| 2,815,663 | * | 12/1957 | Lupfer | 374/208 |
| 2,849,518 | * | 8/1958 | Mac Donald | 374/179 |
| 3,636,756 | * | 1/1972 | White | 73/639 |
| 3,681,990 | * | 8/1972 | Barrett et al. | 374/154 |
| 3,691,846 | * | 9/1972 | Ingold | 73/866.5 |
| 3,983,756 | * | 10/1976 | Danguillier et al. | 73/866.5 |
| 4,331,170 | * | 5/1982 | Wendell | 137/15.12 |
| 4,830,515 | * | 5/1989 | Cortes | 374/208 |
| 5,050,843 | * | 9/1991 | Brooks | 251/214 |
| 6,045,261 | * | 4/2000 | Rossum et al. | 374/208 |

OTHER PUBLICATIONS

Clif Mock Company Product information Operation and Installation instructions and drawing intitled A–3 Retriever Hook Up & Parts Breakdown, 2 pages. No date.

Welker Engineering Company product brochure entitled Automatic Insertion Temperature Probe, 9/98, 2 pages.

Welker Engineering Company Installation and Operation Instructions For Welker Aid–1TP Automatic Insertion Temperature Probe, 2/97, 7 pages, including drawing AD56480 Dec. 1, 1993.

Clif Mock Operations A–3 Sample Retriever True–Cut Series Installation and Operation Procedure, 9 pages–including Clip Mock drawing 2151042. No date.

\* cited by examiner

*Primary Examiner*—Diego Gutierrez
*Assistant Examiner*—Lydia M. De Jesús
(74) *Attorney, Agent, or Firm*—Christensen O'Connor Johnson & Kindness PLLC

(57) ABSTRACT

A retractable thermowell is formed of a fixed thermowell housing on which a movable thermowell housing is threaded. The fixed thermowell housing and the movable thermowell housing together receive a thermowell. The thermowell is secured for axial movement with the movable thermowell housing. When the movable thermowell housing is threaded onto or off the fixed thermowell housing, the movable thermowell housing is moved between respectively an extended and retracted position.

6 Claims, 6 Drawing Sheets

RETRACTABLE THERMOWELL

FIELD OF THE INVENTION

This invention relates to thermowells.

BACKGROUND OF THE INVENTION

Thermowells are frequently placed in pipes to monitor chemical processes and fluids running through the pipes. These pipes are sometimes inspected or cleaned by pigs, and damage can occur to the thermowells if they are left in the pipes. There is thus a need for a readily retractable thermowell that can be easily retracted under pressure from the pipeline or vessel without the need to depressurize the process.

SUMMARY OF THE INVENTION

According to an aspect of the invention, there is provided a retractable thermowell, comprising:

a fixed thermowell housing having a flanged end for connection to a ball valve and a remote end, the fixed thermowell housing have a first bore;

a movable thermowell housing having a slide end and a thermowell securing end, the movable thermowell housing having a second bore;

the slide end of the movable thermowell housing having a sliding connection to the remote end of the fixed thermowell housing with the first bore and second bore axially aligned, and the movable thermowell housing being axially slidable on the fixed thermowell housing between an extended position and a retracted position;

a thermowell received within the first bore and second bore, the thermowell having a first end and a second end, the thermowell being secured to the movable thermowell housing for axial movement with the movable thermowell housing;

a packing between the thermowell and the fixed thermowell housing; and the thermowell being retracted into the fixed thermowell housing when the movable thermowell housing is in the retracted position and the thermowell being extended out of the fixed thermowell housing when the movable thermowell housing is in the extended position.

By this means, a readily retractable thermowell is provided which may be removed easily from a pipe being monitored, and the packing will maintain a sealed condition of the pipe.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one or more of the elements are specified, unless the context clearly requires that there be one and only one.

Figure 1:
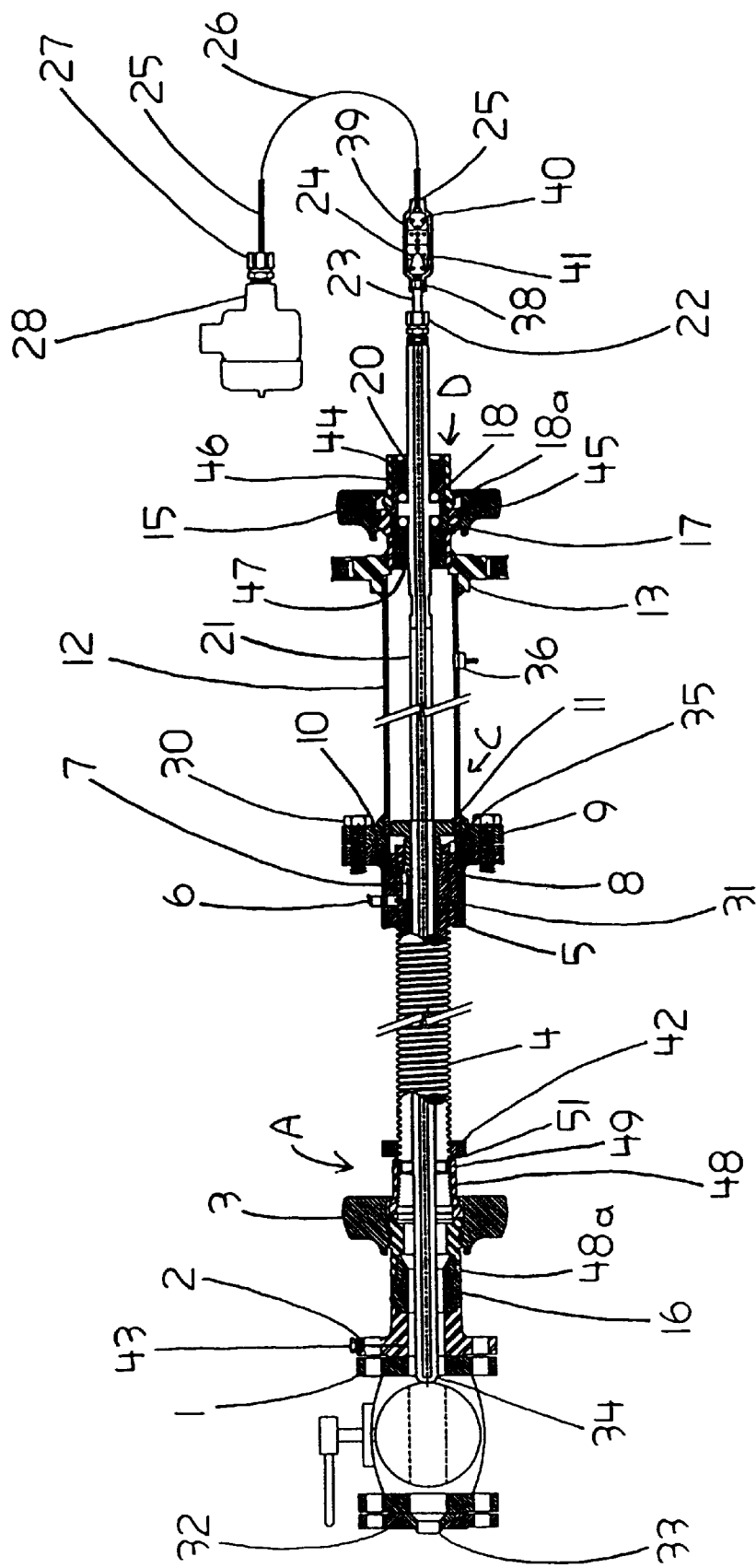
FIG. 1 is a section through a retractable thermowell with fixed thermowell housing and movable thermowell housing according to the invention showing the thermowell in retracted position.
Figure 2:
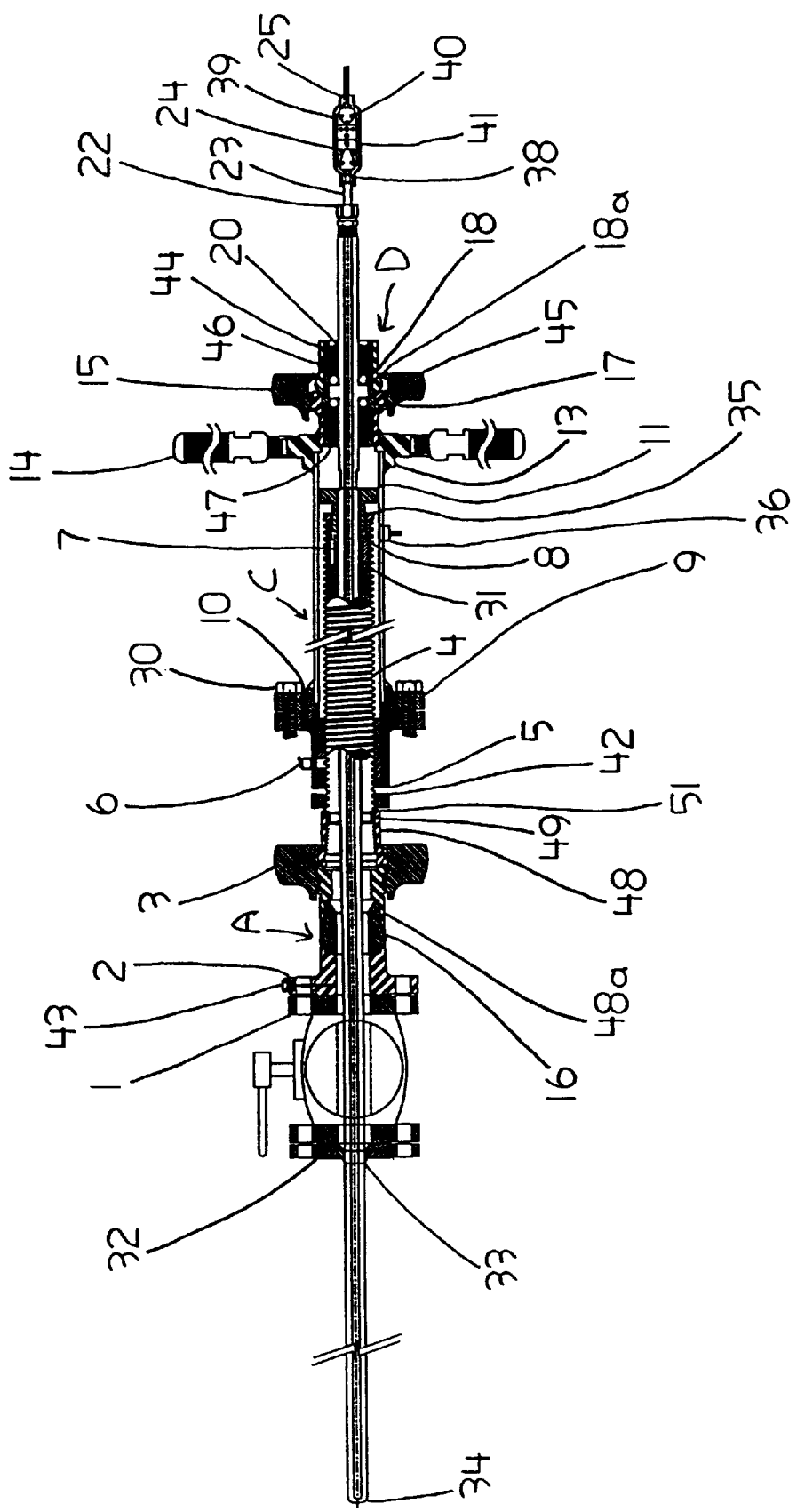
FIG. 2 is a section through a retractable thermowell according to the invention showing the thermowell in extended position.
Figure 3:
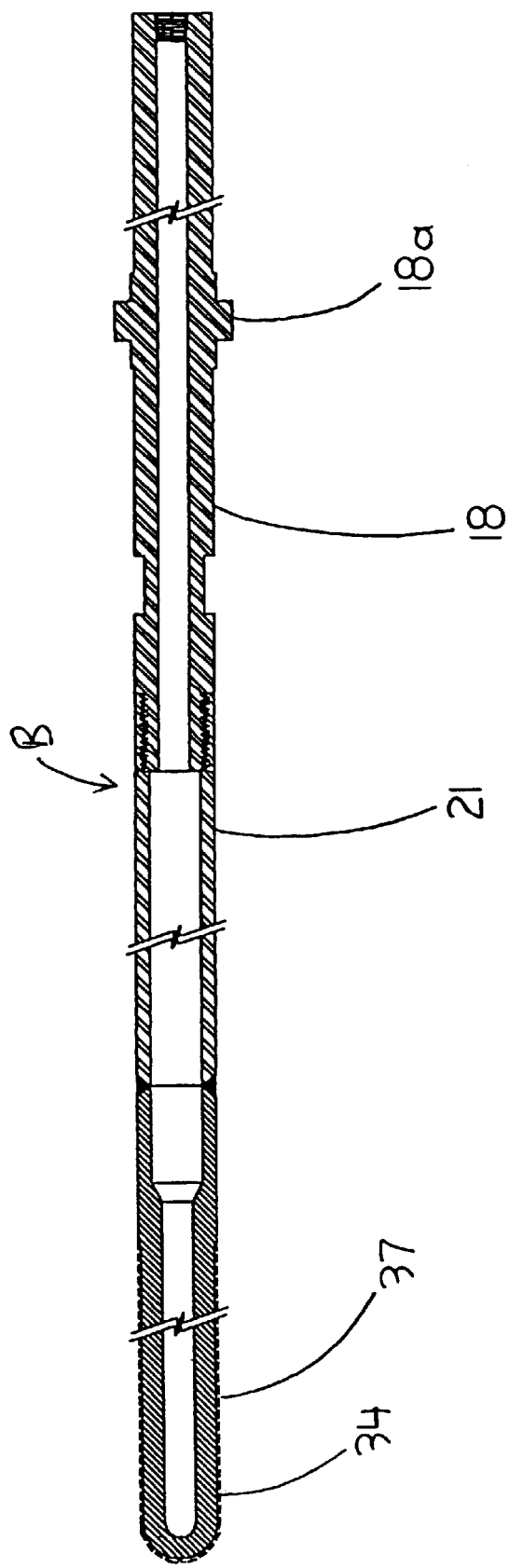
FIG. 3 is a section through a thermowell according to the invention.
Figure 4:
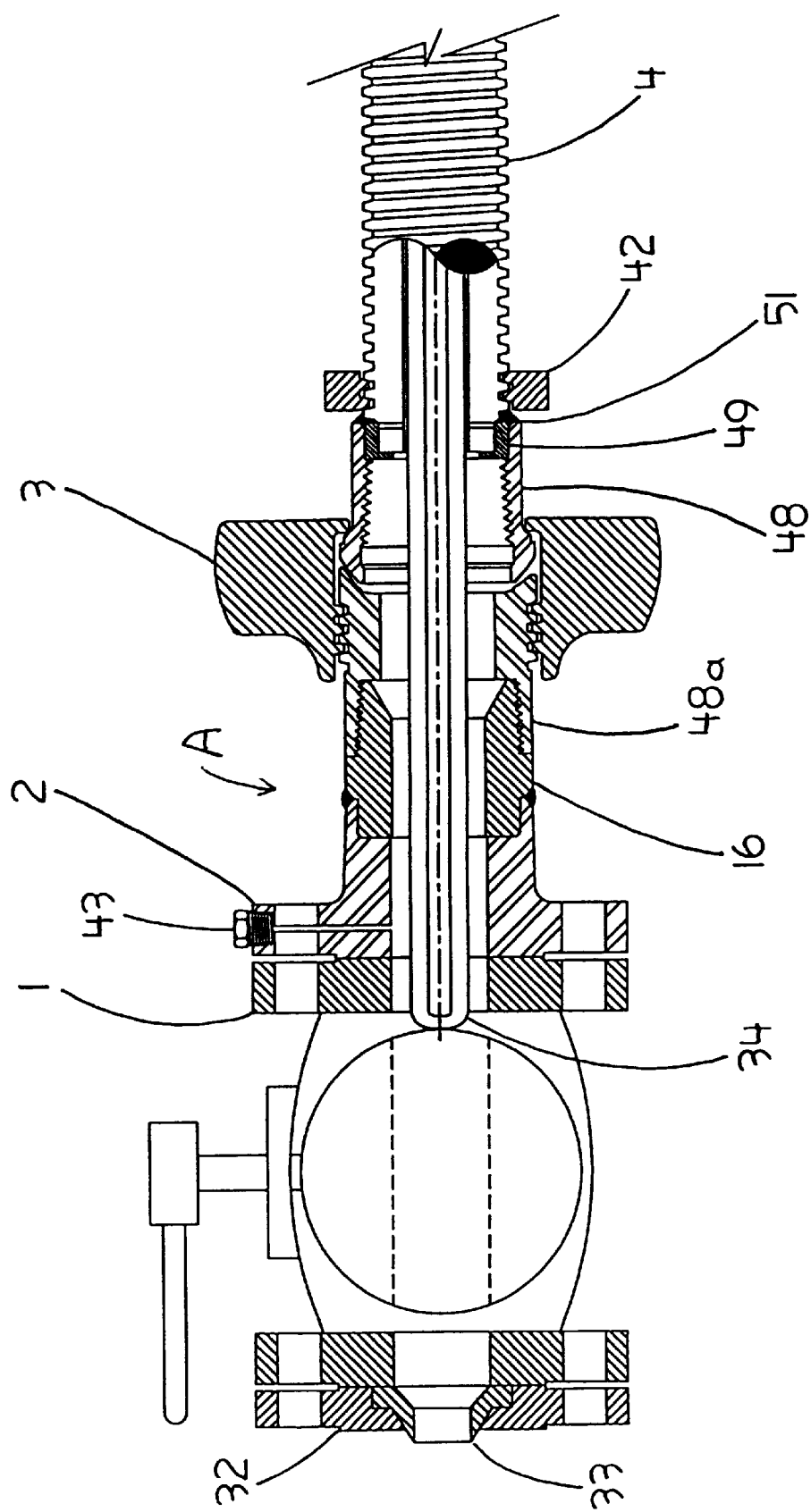
FIG. 4 is an enlarged section of a portion of FIG. 1 showing a ball valve and fixed thermowell housing attached to the ball valve.
Figure 5:
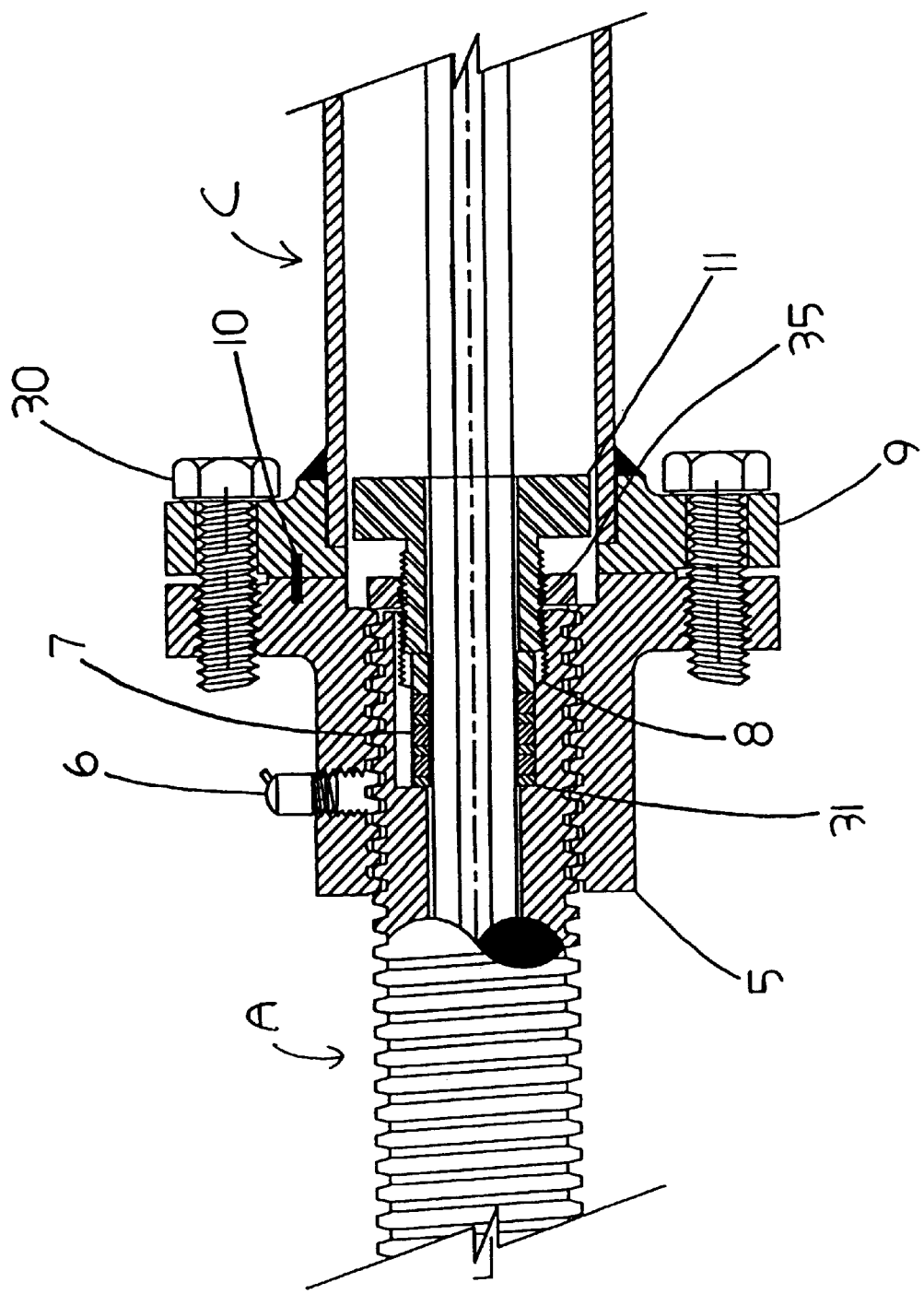
FIG. 5 is an enlarged section of a portion of FIG. 1 showing a remote end of the fixed thermowell housing and its sliding connection to a sliding end of the movable thermowell housing.
Figure 6:
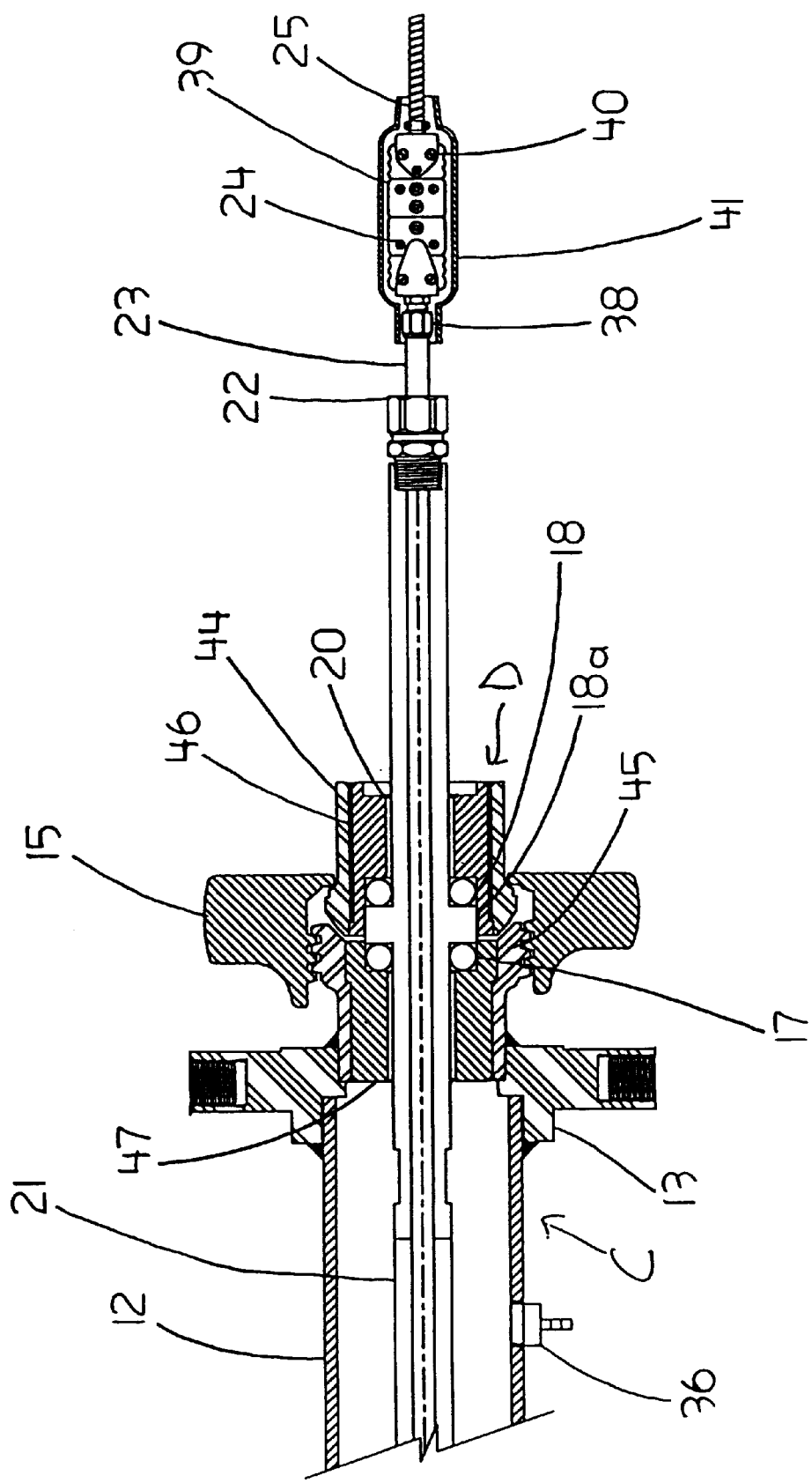
FIG. 6 is an enlarged section of a portion of FIG. 1 showing a thermowell securing end of the movable thermowell housing.

Referring to FIG. 1 and 4, there is shown a retractable thermowell formed of a fixed thermowell housing A having a flanged end 2 for connection in conventional manner to one side of a valve 1. A hex plug 43 seals a bore extending into the flanged end 2. This plug 43 provides a position for a valve to be attached for pressurizing the chamber defined by housing A. A remote threaded end 4 is secured to the flanged end 2 by a joint formed of a wing union welded by weld 51 to the threaded end 4. The wing union is in turn formed of solid half 48 and threaded half 48a, wing union insert 49 and wing 3. Threaded half 48a is threaded to wing union sleeve extension 16 and locked tight during assembly. The wing union sleeve extension 16 is welded to flanged end 2. A bore runs through the fixed thermowell housing. On the other side of the ball valve 1, a blind flange 32 is secured by conventional manner with a centrally located scraper blade insert 33. The insert 33 has a central aperture sized to fit the thermowell B shown in FIG. 3. A stop ring 42 is threaded onto the threads of threaded end 4. At the remote end of the fixed thermowell housing A, remote from the ball valve 1, an annular recess formed by a widening of the bore of the fixed thermowell housing is provided to receive a packing 7 with packing spacers 31. The packing 7 is retained in place by cooperation of a packing follower 8 and packing nut 11 locked by lock nut 35. The inner diameter of the packing 7 is selected to fit snugly on the outer diameter of the thermowell B.

As shown in FIGS. 1, 2, 4 and 5, a movable thermowell housing C has a slide end formed of an interior threaded flanged couple 5 and a variable diameter bore which receives thermowell B. The flanged couple 5 has a grease nipple 6 formed on the threaded section. The movable thermowell housing C has a thermowell securing end D which is formed of a wing union composed of axially aligned solid half 44 and threaded half 45, with wing nut 15 securing the halves 44 and 45 together. A wing union sleeve 46 and wing union insert 47 are welded into the solid half 44 and threaded half 45 respectively. The exterior side of the sleeve 46 is closed off against thermowell B with a dust seal 20. The sleeve 46 and insert 47 have facing shoulders which define an annular recess for receiving two sets of tapered roller bearings 17, one set disposed at each end of the recess. A annular shoulder 18a on the thermowell B is secured against axial movement between the two sets of tapered roller bearings 17. The bearings 17 permit rotation of the movable thermowell housing C on the thermowell B but prevent axial movement of the thermowell B in relation to the movable thermowell housing C. Threaded half 45 of the wing union at the thermowell securing end D of the movable thermowell housing C is welded to a flange 13 to which is attached handles 14. A pipe 12 is welded on one side to the flange 13 and on the other side to flange 9 to connect the slide end of the movable thermowell housing C to the thermowell securing end D. Flange 9 is secured by hex screws 30 to the flanged couple 5, and aligned using guide pin 10. Pipe 12 is provided with a pressure bleed valve 36 which is pulled to bleed.

The flanged couple 5 at the slide end of the movable thermowell housing C thus forms a sliding connection to the remote end of the fixed thermowell housing A with the respective bores of the housings A, C axially aligned. The movable thermowell housing C is axially slidable on the fixed thermowell housing A by helical rotation around the threads on the remote end between an extended position shown in FIG. 2 and a retracted position shown in FIG. 1. The movable thermowell housing C may be rotated on the threads of the remote end by hand using the handles 14.

In the retracted position, the thermowell B is retracted into the fixed thermowell housing A, and the thermowell B is extended out of the fixed thermowell housing A through the ball valve 1 when the movable thermowell housing C is in the extended position.

Thermowell B is formed of a round bar 18 with an annular shoulder 18a. The round bar 18 is threaded onto tubing 21, which is welded to round bar 34 coated with a stellite #6 coating 37.

Compression fitting 22 threads into bar 18 to secure a thermocouple 23 in the thermowell B. Connections to the thermocouple 23 are made through plug adapter 38, plug 24, jack 39, and wire clamp 40 housed within boot 41. A conventional flex conduit 25 covering wire 26 connects the clamp 40 to cord grip 27 of termination head 28.

In operation, the thermowell B may be used to monitor chemical process conditions within a pipe to which ball valve 1 is attached. For this, the thermowell B is in extended position, with the thermocouple 23 inside the thermowell B. When it is desired to run a pig through the pipe, the thermowell B may be retracted from the ball valve 1 by rotation of the handles 14. The movable thermowell housing C cannot move beyond the stop ring 42 on one side and the lock nut 35 on the other side. When the pig has passed, the thermowell B can be returned to the extended position.

BILL OF MATERIALS

| ITEM | QTY | DESCRIPTION | STOCK CODE | COMMENTS/MAT'L |
|---|---|---|---|---|
| 1 | 1 | BALL VALVE (BY OTHERS) | N/S | |
| 2 | 1 | 2" — 300# RFWN FLANGE C/W 4 BOLTS (SHT 23) | N/S | A182 F316/316L SS |
| 3 | 1 | ATS WING UNION SPECIAL COMPRISING ITEM 48 | N/S | FORGED STEEL |
| 4 | 72" | ACME THREAD 2½ OD 3TH/IN (SHT 11) | N/S | A479 303SS |
| 5 | 1 | ACME COUPLE 3⅞ φ × 3" — 150# RF FLANGE (SHT 14) | N/S | PHOSPHOR BRONZE |
| 6 | 1 | GREASE NIPPLE ⅛" NPT (SHT 14) | N/S | |
| 7 | 3 | ¼ SQ GRAPHOIL PACKING 1½" OD × 1" ID (SHT 6) | N/S | |
| 8 | 1 | PACKING FOLLOWER 1.49" OD × 1.06" ID × ½ THK (SHT 6) | 38-00461 | A479 316/316L SS |
| 9 | 2 | 3" — 150# RF SOCKET WELD FLANGE (SHT 13) | N/S | A182 F316/316L SS |
| 10 | 1 | ⅜" × 1" LG GUIDE PIN (SHT 14) | | P/No 240-038 |
| 11 | 1 | PACKING NUT 3" OD RND BAR (SHT 15) | 38-00697 | A479 347 SS |
| 12 | 65⅝" | PIPE 3 OD SCH 40 (SHT 24) | N/S | SA312 316/316L SS |
| 13 | 1 | 3" — 300# RF RAISED HUB BLIND FLG NO BOLT HOLES (SHT 25) | N/S | A182 F316/316L SS |
| 14 | 4 | HANDLES 1½ OD 8½ LG (SHT 3) | 38-00461 | A479 316/316L SS |
| 15 | 1 | ATS WING UNION COMPRISING ITEMS 44,45 | N/S | FORGED STEEL |
| 16 | 1 | 2" NPT WING UNION SLEEVE EXTENSION (SHT 17) | 38-00679 | A479 347 SS |
| 17 | 2 | BEARING TAPERED ROLLER 1" ID × 2" OD TYP. | N/S | |
| 18 | 1 | 1¾" OD RND BAR (SHT 10) | 38-00646 | A479 316/316L SS |
| 19 | | DELETED | | |
| 20 | 1 | DUST SEAL 1" ID | N/S | |
| 21 | 1 | TUBING 1" OD × 0.180 wt (SHT 9) | N/S | SA-213 TP 316/316L SS |
| 22 | 1 | COMPRESSION FITTING ½ NPT × ¼" TUBE | 12-01110 | STAINLESS STEEL |
| 23 | 1 | THERMOCOUPLE TYPE J, 250-J-316 UNGROUNDED | 30-01180 | 316 SS |
| 24 | 1 | PLUG TYPE J 1055-J SOLID PIN | 02-00085 | THERMOSET |
| 25 | 1 | FLEX ARMOUR ¼ OD TEFLON COATED | 12-00220 | STAINLESS STEEL |
| 26 | 1 | WIRE TYPE J-TE/TE-20F | 26-00370 | TEFLON |
| 27 | 1 | CORD GRIP ½" NPT × ¼" ID | 03-00040 | GALV STEEL |
| 28 | 1 | SERIES 8000 HEAD C.A. EPOXY COATED CL1DIV1 GRP-B,C,D | 01-00079 | CAST ALUMINUM |
| 29 | | DELETED | | |
| 30 | 4 | HEAVY HEX SCREWS 2" LONG ⅝–11 UNC PLATED STEEL | N/S | B7 A193 AISI 4140 |
| 31 | 3 | PACKING SPACERS 1.49 OD × 1.06 ID × ⅛ (SHT 6) | N/S | A479 316/316L SS |
| 32 | 1 | 2" — 300# RF BLIND FLG MACH. RF BOTH SIDES (SHT 16) | 33-00096 | A182 F316/316L SS |
| 33 | 1 | SCRAPER BLADE INSERT (SHT 7) | 38-00690 | C/S 4140 |
| 34 | 67" | RND BAR 1⅜" φ (SHT 8) | 38-00331 | A479 316/316L SS |
| 35 | 1 | LOCK NUT 3" RND BAR (SHT 15) | 38-00697 | A479 347 SS |
| 36 | 1 | ¼" NPT PRESSURE BLEED VALVE | 01-00327 | STAINLESS STEEL |
| 37 | 1 | STELLITE #6 COATING 0.020 ± 0.005 (SHT 8) | N/S | STELLITE #6 |
| 38 | 1 | PLUG ADAPTER 1070 1/4 | 02-01120 | STAINLESS STEEL |
| 39 | 1 | JACK TYPE J 1015-J | 02-00090 | THERMOSET |
| 40 | 1 | WIRE CLAMP 1082 | 02-01320 | PLATED STEEL |
| 41 | 1 | WEATHER PROOF BOOT | 02-01030 | RUBBER |
| 42 | 1 | ACME COUPLE STOP RING (SHT 21) | N/S | A479 303 SS |

-continued

BILL OF MATERIALS

| ITEM | QTY | DESCRIPTION | STOCK CODE | COMMENTS/MAT'L |
|---|---|---|---|---|
| 43 | 1 | HEX PLUG ¼" NPT (SHT 23) | 13-01990 | A479 316 SS |
| 44 | 1 | WING UNION SOLD HALF (SHT 19) | N/S | FORGED STEEL |
| 45 | 1 | WING UNION THREADED HALF (SHT 20) | N/S | FORGED STEEL |
| 46 | 1 | WING UNION SLEAVE (SHT 22) | 38-00697 | A479 347 SS |
| 47 | 1 | WING UNION INSERT (SHT 18) | 38-00697 | A479 347 SS |
| 48 | 1 | WING UNION SOLID HALF (SHT 26) | 38-00697 | FORGED STEEL |
| 49 | 1 | WING UNION INSERT (SHT 27) | N/S | A479 347 SS |

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A retractable thermowell, comprising:

a fixed thermowell housing having a flanged end for connection to a valve and a remote end, the fixed thermowell housing have a first bore;

a movable thermowell housing having a slide end and a thermowell securing end, the movable thermowell housing having a second bore, the fixed thermowell housing being received within the second bore;

the slide end of the movable thermowell housing having a sliding connection to the remote end of the fixed thermowell housing with the first bore and second bore axially aligned, and the movable thermowell housing being axially slidable on the fixed thermowell housing between an extended position and a retracted position;

a thermowell received within the first bore and second bore, the thermowell having a first end and a second end, the thermowell being secured to the movable thermowell housing for axial movement with the movable thermowell housing;

a packing between and sealed against the thermowell and the fixed thermowell housing; and the thermowell being retracted into the fixed thermowell housing when the movable thermowell housing is in the retracted position and the thermowell being extended out of the fixed thermowell housing when the movable thermowell housing is in the extended position.

2. The retractable thermowell of claim 1 in which the fixed thermowell housing has exterior threads at the remote end, and the slide end of the movable thermowell housing has interior threads threaded onto the exterior threads of the fixed thermowell housing, the sliding connection between the fixed thermowell housing and the movable thermowell housing being formed by cooperation of the exterior threads and interior threads.

3. The retractable thermowell of claim 1 in which the packing is at the remote end of the fixed thermowell housing.

4. The retractable thermowell of claim 2 further comprising:

a handle on the thermowell securing end of the movable thermowell housing for rotating the movable thermowell housing in relation to the fixed thermowell housing.

5. The retractable thermowell of claim 4 in which the thermowell is secured to the movable thermowell housing to prevent relative axial movement between the thermowell and movable thermowell housing at the thermowell securing end by a bearing which permits rotation of the movable thermowell housing about the thermowell.

6. The retractable thermowell of claim 1 in which the fixed thermowell housing is formed of a flanged section and a threaded section and the flanged section is secured to the threaded section by a wing union.

\* \* \* \* \*